(12) United States Patent
Opdenbosch et al.

(10) Patent No.: US 8,978,374 B2
(45) Date of Patent: Mar. 17, 2015

(54) METERLESS HYDRAULIC SYSTEM HAVING FLOW SHARING AND COMBINING FUNCTIONALITY

(75) Inventors: Patrick Opdenbosch, Peoria, IL (US); Lawrence J. Tognetti, Peoria, IL (US); Bryan J. Hillman, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 713 days.

(21) Appl. No.: 13/279,064

(22) Filed: Oct. 21, 2011

(65) Prior Publication Data

US 2013/0098019 A1 Apr. 25, 2013

(51) Int. Cl.
*F15B 11/17* (2006.01)
*F15B 7/00* (2006.01)
*E02F 9/22* (2006.01)

(52) U.S. Cl.
CPC ............... *F15B 11/17* (2013.01); *F15B 7/006* (2013.01); *F15B 7/008* (2013.01); *E02F 9/2217* (2013.01); *E02F 9/2242* (2013.01); *E02F 9/2289* (2013.01); *E02F 9/2292* (2013.01); *E02F 9/2296* (2013.01); *F15B 2211/20546* (2013.01); *F15B 2211/20569* (2013.01); *F15B 2211/20576* (2013.01); *F15B 2211/27* (2013.01); *F15B 2211/30575* (2013.01); *F15B 2211/613* (2013.01); *F15B 2211/7053* (2013.01); *F15B 2211/7058* (2013.01)
USPC .............................................. 60/421; 60/422

(58) Field of Classification Search
USPC ............................ 60/420, 421, 422, 484, 486
See application file for complete search history.

(56) References Cited

U.S. PATENT DOCUMENTS

| | | | |
|---|---|---|---|
| 4,367,624 A | 1/1983 | Ogata et al. | |
| 4,369,625 A * | 1/1983 | Izumi et al. | ..................... 60/421 |
| 4,449,366 A | 5/1984 | Sato et al. | |
| 4,561,249 A | 12/1985 | Watanabe et al. | |
| 4,586,330 A | 5/1986 | Watanabe et al. | |
| 4,768,339 A | 9/1988 | Aoyagi et al. | |
| 4,833,798 A | 5/1989 | Ehrich | |

(Continued)

FOREIGN PATENT DOCUMENTS

| | | |
|---|---|---|
| EP | 1288505 A1 | 3/2003 |
| EP | 1 598 561 | 11/2005 |

(Continued)

OTHER PUBLICATIONS

Linjama, M., entitled "Digital Fluid Power-State of the Art", The 12$^{th}$ Scandinavian International Conference on Fluid Power, Tampere, Finland (May 18-20, 2011).

(Continued)

*Primary Examiner* — Thomas E Lazo
(74) *Attorney, Agent, or Firm* — Finnegan, Henderson, Farabow, Garrett & Dunner, LLP (57) ABSTRACT

A hydraulic system includes a variable-displacement first pump and a variable-displacement second pump. The hydraulic system also includes a first actuator selectively connected either to the first pump in a closed loop manner and not the second pump, to the second pump in a closed loop manner and not the first pump, or to the first and second pumps in a closed loop manner. The hydraulic system further includes a second actuator and a variable-displacement rotary actuator that are each selectively connected either to the first pump in a closed loop manner and not the second pump, to the second pump in a closed loop manner and not the first pump, or to the first and second pumps in a closed loop manner.

23 Claims, 3 Drawing Sheets

(56) References Cited

U.S. PATENT DOCUMENTS

| | | | |
|---|---|---|---|
| 5,048,293 | A | 9/1991 | Aoyagi |
| 5,329,767 | A | 7/1994 | Hewett |
| 6,145,287 | A | 11/2000 | Rosskopf |
| 6,330,797 | B1 | 12/2001 | Kondo |
| 6,745,992 | B2 | 6/2004 | Yang et al. |
| 6,789,335 | B1 | 9/2004 | Kinugawa et al. |
| 6,918,247 | B1 | 7/2005 | Warner |
| 7,243,591 | B2 | 7/2007 | Dixen et al. |
| 7,260,931 | B2 | 8/2007 | Egelja et al. |
| 7,272,928 | B2 | 9/2007 | Ariga et al. |
| 7,412,827 | B2 | 8/2008 | Verkuilen |
| 7,434,391 | B2 | 10/2008 | Asam et al. |
| 7,490,421 | B1 | 2/2009 | Pletzer et al. |
| 7,516,613 | B2 | 4/2009 | Kadlicko |
| 7,743,611 | B2 * | 6/2010 | Horii .............................. 60/421 |
| 2004/0083629 | A1 | 5/2004 | Kondou |
| 2004/0123499 | A1 | 7/2004 | Arii |
| 2005/0012337 | A1 | 1/2005 | Yoshimatsu |
| 2005/0036894 | A1 | 2/2005 | Oguri |
| 2007/0044463 | A1 | 3/2007 | VerKuilen et al. |
| 2008/0250783 | A1 | 10/2008 | Griswold |
| 2008/0300757 | A1 | 12/2008 | Kanayama et al. |
| 2008/0314038 | A1 | 12/2008 | Tozawa et al. |
| 2009/0165450 | A1 | 7/2009 | Cherney et al. |
| 2009/0288408 | A1 | 11/2009 | Tozawa et al. |
| 2010/0000209 | A1 | 1/2010 | Wada et al. |
| 2010/0000211 | A1 | 1/2010 | Ikeda et al. |
| 2010/0043420 | A1 | 2/2010 | Ikeda et al. |
| 2010/0107620 | A1 | 5/2010 | Nelson et al. |
| 2010/0115936 | A1 | 5/2010 | Williamson et al. |
| 2010/0162593 | A1 | 7/2010 | Hughes, IV et al. |
| 2010/0162885 | A1 | 7/2010 | Hughes, IV et al. |
| 2010/0163258 | A1 | 7/2010 | Hughes, IV et al. |
| 2010/0218493 | A1 | 9/2010 | Nakamura et al. |
| 2011/0029206 | A1 | 2/2011 | Kang et al. |
| 2011/0030364 | A1 | 2/2011 | Persson et al. |
| 2013/0047592 | A1 | 2/2013 | Opdenbosch et al. |
| 2013/0047599 | A1 | 2/2013 | Opdenbosch et al. |
| 2013/0048117 | A1 | 2/2013 | Opdenbosch et al. |
| 2013/0081382 | A1 | 4/2013 | Nelson et al. |
| 2013/0081383 | A1 | 4/2013 | Knussman |
| 2013/0081384 | A1 | 4/2013 | Opdenbosch |
| 2013/0081385 | A1 | 4/2013 | Opdenbosch |
| 2013/0081704 | A1 | 4/2013 | Opdenbosch |
| 2013/0098010 | A1 | 4/2013 | Edler et al. |
| 2013/0098011 | A1 | 4/2013 | Knussman |
| 2013/0098012 | A1 | 4/2013 | Opdenbosch |
| 2013/0098013 | A1 | 4/2013 | Edler et al. |
| 2013/0098014 | A1 | 4/2013 | Kuehn et al. |
| 2013/0098015 | A1 | 4/2013 | Opdenbosch |
| 2013/0098016 | A1 | 4/2013 | Opdenbosch et al. |
| 2013/0098017 | A1 | 4/2013 | Knussman et al. |
| 2013/0098018 | A1 | 4/2013 | Knussman |
| 2013/0098020 | A1 | 4/2013 | Opdenbosch et al. |
| 2013/0098024 | A1 | 4/2013 | Knussman et al. |
| 2013/0098458 | A1 | 4/2013 | Knussman |
| 2013/0098459 | A1 | 4/2013 | Opdenbosch |
| 2013/0098463 | A1 | 4/2013 | Kuehn et al. |
| 2013/0098464 | A1 | 4/2013 | Knussman |

FOREIGN PATENT DOCUMENTS

| | | |
|---|---|---|
| GB | 2 269 425 | 2/1994 |
| JP | 56-016735 | 2/1981 |
| JP | 57-134007 | 8/1982 |
| JP | 58-044133 | 3/1983 |
| JP | 02-108733 | 4/1990 |
| JP | 06-057786 | 3/1994 |
| JP | 10-96402 | 4/1998 |
| JP | 2006-118685 | 5/2006 |
| JP | 2007-247701 | 9/2007 |
| JP | 2011-069432 | 4/2011 |
| WO | WO 2005/024246 | 3/2005 |
| WO | WO 2009/084853 | 7/2009 |
| WO | WO 2009/123047 | 10/2009 |
| WO | WO 2010/040890 | 4/2010 |
| WO | WO 2011/041410 | 4/2011 |

OTHER PUBLICATIONS

Zimmerman, J. PhD Student/Purdue University, Center for Compact and Efficient Fluid Power PowerPoint Presentation, 2010 Annual Meeting (Jun. 14).

Zimmerman, J. et al., entitled "Hybrid Displacement Controlled Multi-Actuator Hydraulic Systems", The Twelfth Scandinavian International Conference on Fluid Power, Tampere, Finland (May 18-20, 2011).

Linde Hydraulics Brochure entitled "HPV-02. Variable Pumps for Closed Loop Operation", pp. 1-36.

Brezonick, M., entitled "The Potential of Pump-Controlled Hydraulics", Hydraulic Horizons, Diesel Progress North American Edition (Jan. 2009).

Zick, J., entitled "Verbesserte Leistungsausnutzung bei Erdbaumaschinen durch optimal Pumpensteuerung", Olhydraulic and pneumatic 20 (1976) Nr. 4.

U.S. Appl. No. 13/222,895 by Patrick Opdenbosch et al., entitled "Meterless Hydraulic System Having Displacement Control Valve", filed Aug. 31, 2011.

U.S. Appl. No. 13/222,945 by Patrick Opdenbosch et al., entitled "Meterless Hydraulic System Having Restricted Primary Makeup", filed Aug. 31, 2011.

U.S. Appl. No. 13/222,990 by Patrick Opdenbosch et al., entitled "Meterless Hydraulic System Having Load-Holding Bypass", filed Aug. 31, 2011.

U.S. Appl. No. 13/249,932 by Bryan E. Nelson et al., entitled "Regeneration Configuration for Closed-Loop Hydraulic Systems", filed Sep. 30, 2011.

U.S. Appl. No. 13/250,067 by Patrick Opdenbosch, entitled "Meterless Hydraulic System Having Multi-Actuator Circuit", filed Sep. 30, 2011.

U.S. Appl. No. 13/250,250 by Patrick Opdenbosch, entitled "Meterless Hydraulic System Having Multi-Actuator Circuit", filed Sep. 30, 2011.

U.S. Appl. No. 13/250,002 by Michael L. Knussman, entitled "Closed-Loop Hydraulic System Having Energy Recovery", filed Sep. 30, 2011.

U.S. Appl. No. 13/250,171 of Patrick Opdenbosch, entitled "Meterless Hydraulic System Having Pump Protection", filed Sep. 30, 2011.

U.S. Appl. No. 13/278,895 of Michael L. Knussman et al., entitled "Hydraulic System", filed Oct. 21, 2011.

U.S. Appl. No. 13/278,939 of Michael L. Knussman, entitled "Hydraulic System", filed Oct. 21, 2011.

U.S. Appl. No. 13/278,720 of Patrick Opdenbosch, entitled "Meterless Hydraulic System Having Multi-Circuit Recuperation", filed Oct. 21, 2011.

U.S. Appl. No. 13/278,623 of Patrick Opdenbosch, entitled "Closed-Loop Hydraulic System Having Flow Combining and Recuperation", filed Oct. 21, 2011.

U.S. Appl. No. 13/278,924 of Patrick Opdenbosch et al., entitled "Meterless Hydraulic System Having Flow Sharing and Combining Functionality", filed Oct. 21, 2011.

U.S. Appl. No. 13/279,895 of Patrick Opdenbosch et al., entitled "Hydraulic System", filed Oct. 21, 2011.

U.S. Appl. No. 13/279,177 of Patrick Opdenbosch et al., entitled "Meterless Hydraulic System Having Flow Sharing and Combining Functionality", filed Oct. 21, 2011.

U.S. Appl. No. 13/278,556 of Michael L. Knussman, entitled "Closed-Loop Hydraulic System Having Regeneration Configuration", filed Oct. 21, 2011.

U.S. Appl. No. 13/278,894 of Patrick Opdenbosch, entitled "Hydraulic System Having Flow Combining Capabilities", filed Oct. 21, 2011.

U.S. Appl. 13/278,939 of Michael L. Knussman, entitled "Hydraulic System", filed Oct. 21, 2011.

U.S. Appl. No. 13/278,745 of Brad A. Edler et al., entitled "Closed-Loop System Having Multi-Circuit Flow Sharing", filed Oct. 21, 2011.

(56) References Cited

OTHER PUBLICATIONS

U.S. Appl. No. 13/278,650 of Michael L. Knussman, entitled "Hydraulic System Having Multiple Closed-Loop Circuits", filed Oct. 21, 2011.

U.S. Appl. No. 13/278,479 of Brad A. Edler et al., entitled "Closed-Loop Hydraulic System Having Priority-Based Sharing", filed Oct. 21, 2011.

U.S. Appl. No. 13/278,589 of Michael L. Knussman, entitled "Hydraulic System Having Multiple Closed-Loop Circuits", filed Oct. 21, 2011.

U.S. Appl. No. 13/278,788 of Jeffrey L. Kuehn et al., entitled "Closed-Loop Hydraulic System Having Force Modulation", filed Oct. 21, 2011.

U.S. Appl. No. 13/278,491 of Jeffrey L. Kuehn et al., entitled "Meterless Hydraulic System Having Sharing and Combining Functionality", filed Oct. 21, 2011.

U.S. Appl. No. 13/278,935 of Michael L. Knussman et al., entitled "Hydraulic System", filed Oct. 21, 2011.

Grabbel et al., "An investigation of swash plate control concepts for displacement controlled actuators," International Journal of Fluid Power, 2005, 6(2), pp. 19-36.

Wang et al., "A hydraulic circuit with dynamical compensations," Institute for Fluid Power Education, 52nd National Conference on Fluid Power (IFPE 2011), Session 19,3, 529-538 (Las Vegas, Nevada, USA, Mar. 24, 2011).

Williamson et al , "Stability and motion control of inertial loads with displacement controlled hydraulic actuators," Proceedings of the 6th Fluid Power Network International (FPNI) Ph.D. Symposium (West Lafayette Indiana, USA Jun. 15-19, 2010).

\* cited by examiner

METERLESS HYDRAULIC SYSTEM HAVING FLOW SHARING AND COMBINING FUNCTIONALITY

TECHNICAL FIELD

The present disclosure relates generally to a hydraulic system and, more particularly, to a meterless hydraulic system having flow sharing and combining functionality.

BACKGROUND

A conventional hydraulic system includes a pump that draws low-pressure fluid from a tank, pressurizes the fluid, and makes the pressurized fluid available to multiple different actuators for use in moving the actuators. In this arrangement, a speed of each actuator can be independently controlled by selectively throttling (i.e., restricting) a flow of the pressurized fluid from the pump into each actuator. For example, to move a particular actuator at a high speed, the flow of fluid from the pump into the actuator is restricted by only a small amount. In contrast, to move the same or another actuator at a low speed, the restriction placed on the flow of fluid is increased. Although adequate for many applications, the use of fluid restriction to control actuator speed can result in flow losses that reduce an overall efficiency of a hydraulic system.

An alternative type of hydraulic system is known as a meterless hydraulic system. A meterless hydraulic system generally includes a pump connected in closed-loop fashion to a single actuator or to a pair of actuators operating in tandem. During operation, the pump draws fluid from one chamber of the actuator(s) and discharges pressurized fluid to an opposing chamber of the same actuator(s). To move the actuator(s) at a higher speed, the pump discharges fluid at a faster rate. To move the actuator with a lower speed, the pump discharges the fluid at a slower rate. A meterless hydraulic system is generally more efficient than a conventional hydraulic system because the speed of the actuator(s) is controlled through pump operation as opposed to fluid restriction. That is, the pump is controlled to only discharge as much fluid as is necessary to move the actuator(s) at a desired speed, and no throttling of a fluid flow is required.

An exemplary meterless hydraulic system is disclosed in U.S. Pat. No. 4,369,625 of Izumi et al., which published on Jan. 25, 1983 (the '625 patent). In the '625 patent, a multi-actuator meterless-type hydraulic system is described that has flow combining functionality. The hydraulic system includes a swing circuit, a boom circuit, a stick circuit, a bucket circuit, a left travel circuit, and a right travel circuit. Each of the swing, boom, stick, and bucket circuits have a pump connected to a specialized actuator in a closed-loop manner. In addition, a first combining valve is connected between the swing and stick circuits, a second combining valve is connected between the stick and boom circuits, and a third combining valve is connected between the bucket and boom circuits. The left and right travel circuits are connected in parallel to the pumps of the bucket and boom circuits, respectively. In this configuration, any one actuator can receive pressurized fluid from more than one pump such that its speed is limited by the capacity of a single pump.

Although an improvement over existing meterless hydraulic systems, the meterless hydraulic system of the '625 patent described above may still be less than optimal. In particular, operation of connected circuits of the system may only be sequentially performed. In addition, the speeds and forces of the various actuators may be difficult to control.

The hydraulic system of the present disclosure is directed toward solving one or more of the problems set forth above and/or other problems of the prior art.

SUMMARY

In one aspect, the present disclosure is directed to a hydraulic system including a variable-displacement first pump and a variable-displacement second pump. The hydraulic system also includes a first actuator selectively connected either to the first pump in a closed loop manner and not the second pump, to the second pump in a closed loop manner and not the first pump, or to the first and second pumps in a closed loop manner. The hydraulic system further includes a second actuator selectively connected either to the first pump in a closed loop manner and not the second pump, to the second pump in a closed loop manner and not the first pump, or to the first and second pumps in a closed loop manner. The hydraulic system also includes a variable-displacement rotary actuator selectively connected either to the first pump in a closed loop manner and not the second pump, to the second pump in a closed loop manner and not the first pump, or to the first and second pumps in a closed loop manner.

In another aspect, the present disclosure is directed to a hydraulic system including a variable-displacement first pump, a variable-displacement second pump, a first actuator configured to connect to at least one of the first pump or the second pump in a closed loop manner, a linear actuator configured to connect to at least one of the first pump or the second pump in a closed loop manner, and a variable-displacement rotary actuator configured to connect to at least one of the first pump or the second pump in a closed loop manner. The hydraulic system also includes at least one combiner valve arrangement configured to combine fluid pressurized by the first pump and the second pump to form a combined flow, and the combined flow is communicated in a closed loop manner to at least one of the first actuator, the linear actuator, or the rotary actuator. The hydraulic system also includes at least one first switching valve connected to the linear actuator. The at least one switching valve is configured to control an amount of fluid directed to the linear actuator from at least one of the first pump or the second pump.

In another aspect, the present disclosure is directed to a method of operating a hydraulic system. The method includes pressurizing fluid with a first variable-displacement pump and pressurizing fluid with a second variable-displacement pump. The first and second pumps are capable of simultaneously supplying pressurized fluid to at least three actuators, and the at least three actuators include a variable-displacement rotary actuator, a linear actuator, and a third actuator. The method also includes combining fluid pressurized by the first pump and the second pump, communicating the combined fluid to at least one of the at least three actuators in a closed loop manner, communicating fluid pressurized by at least one of the first pump or the second pump to the linear actuator in a closed loop manner, and communicating fluid pressurized by at least one of the first pump or the second pump to the rotary actuator in a closed loop manner. The method further includes adjusting displacement of the rotary actuator to control torque output of the rotary actuator, and metering the flow passing between the first and second pumps and the linear actuator to control movement of the linear actuator.

DETAILED DESCRIPTION

Reference will now be made in detail to the present exemplary embodiments of the invention, examples of which are illustrated in the accompanying drawings. Wherever possible, the same reference numbers will be used throughout the drawings to refer to the same or like parts.

Figure 1:
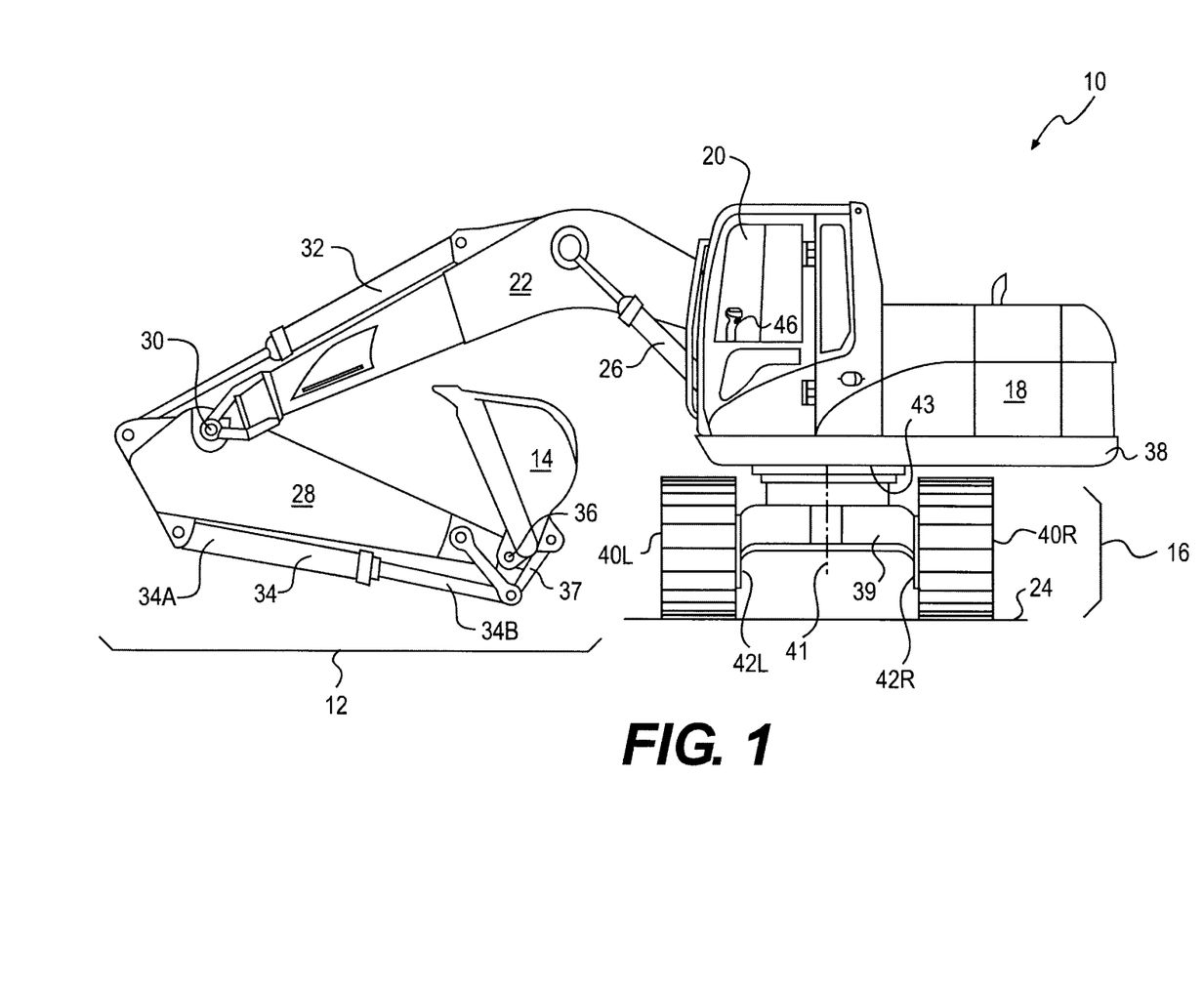
FIG. 1 is a pictorial illustration of an exemplary disclosed machine.

FIG. 1 illustrates an exemplary machine 10 having multiple systems and components that cooperate to accomplish a task. Machine 10 may embody a fixed or mobile machine that performs some type of operation associated with an industry such as mining, construction, farming, transportation, or another industry known in the art. For example, machine 10 may be an earth moving machine such as an excavator (shown in FIG. 1), a dozer, a loader, a backhoe, a motor grader, a dump truck, or any other earth moving machine. Machine 10 may include an implement system 12 configured to move a work tool 14, a drive system 16 for propelling machine 10, a power source 18 that provides power to implement system 12 and drive system 16, and an operator station 20 situated for manual control of implement system 12, drive system 16, and/or power source 18.

Implement system 12 may include a linkage structure acted on by fluid actuators to move work tool 14. Specifically, implement system 12 may include a boom 22 that is vertically pivotal about a horizontal axis (not shown) relative to a work surface 24 by a pair of adjacent, double-acting, hydraulic cylinders 26 (only one shown in FIG. 1). Implement system 12 may also include a stick 28 that is vertically pivotal about a horizontal axis 30 by a single, double-acting, hydraulic cylinder 32. Implement system 12 may further include a single, double-acting, hydraulic cylinder 34 that is operatively connected between stick 28 and work tool 14 to pivot work tool 14 vertically about a horizontal pivot axis 36. In the disclosed embodiment, hydraulic cylinder 34 is connected at a head-end 34A to a portion of stick 28 and at an opposing rod-end 34B to work tool 14 by way of a power link 37. Boom 22 may be pivotally connected to a body 38 of machine 10. Body 38 may be pivotally connected to an undercarriage 39 and movable about a vertical axis 41 by a hydraulic swing motor 43. Stick 28 may pivotally connect boom 22 to work tool 14 by way of axis 30 and 36.

Numerous different work tools 14 may be attachable to a single machine 10 and operator controllable. Work tool 14 may include any device used to perform a particular task such as, for example, a bucket, a fork arrangement, a blade, a shovel, a ripper, a dump bed, a broom, a snow blower, a propelling device, a cutting device, a grasping device, or any other task-performing device known in the art. Although connected in the embodiment of FIG. 1 to pivot in the vertical direction relative to body 38 of machine 10 and to swing in the horizontal direction, work tool 14 may alternatively or additionally rotate, slide, open and close, or move in any other manner known in the art.

Drive system 16 may include one or more traction devices powered to propel machine 10. In the disclosed example, drive system 16 includes a left track 40L located on one side of machine 10, and a right track 40R located on an opposing side of machine 10. Left track 40L may be driven by a left travel motor 42L, while right track 40R may be driven by a right travel motor 42R. It is contemplated that drive system 16 could alternatively include traction devices other than tracks such as wheels, belts, or other known traction devices. Machine 10 may be steered by generating a speed and/or rotational direction difference between left and right travel motors 42L, 42R, while straight travel may be facilitated by generating substantially equal output speeds and rotational directions from left and right travel motors 42L, 42R.

Power source 18 may embody an engine such as, for example, a diesel engine, a gasoline engine, a gaseous fuel-powered engine, or any other type of combustion engine known in the art. It is contemplated that power source 18 may alternatively embody a non-combustion source of power such as a fuel cell, a power storage device, or another source known in the art. Power source 18 may produce a mechanical or electrical power output that may then be converted to hydraulic power for moving hydraulic cylinders 26, 32, 34 and left travel, right travel, and swing motors 42L, 42R, 43.

Operator station 20 may include devices that receive input from a machine operator indicative of desired machine maneuvering. Specifically, operator station 20 may include one or more operator interface devices 46, for example a joystick, a steering wheel, or a pedal, that are located proximate an operator seat (not shown). Operator interface devices 46 may initiate movement of machine 10, for example travel and/or tool movement, by producing displacement signals that are indicative of desired machine maneuvering. As an operator moves interface device 46, the operator may affect a corresponding machine movement in a desired direction, with a desired speed, and/or with a desired force.

Figure 2:
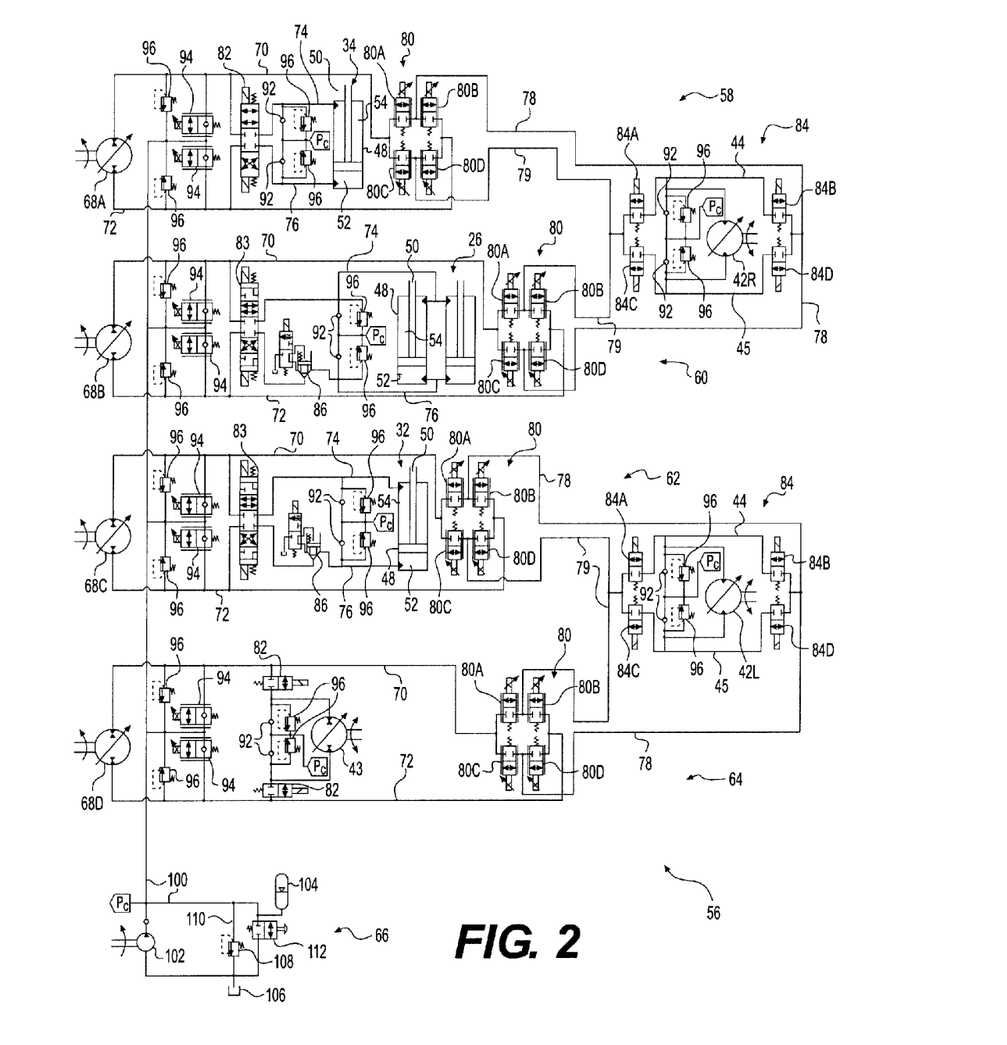
FIG. 2 is a schematic illustration of an exemplary disclosed hydraulic system that may be used in conjunction with the machine of FIG. 1.

As shown in FIG. 2, hydraulic cylinders 26, 32, 34 may each include a tube 48 and a piston assembly 50 arranged within tube 48 to form a first chamber 52 and an opposing second chamber 54. In one example, a rod portion of piston assembly 50 may extend through an end of second chamber 54. As such, second chamber 54 may be considered the rod-end chamber of hydraulic cylinders 26, 32, 34, while first chamber 52 may be considered the head-end chamber.

First and second chambers 52, 54 may each be selectively supplied with pressurized fluid and drained of the pressurized fluid to cause piston assembly 50 to displace within tube 48, thereby changing an effective length of hydraulic cylinders 26, 32, 34 and moving work tool 14 (referring to FIG. 1). A flow rate of fluid into and out of first and second chambers 52, 54 may relate to a translational velocity of hydraulic cylinders 26, 32, 34, while a pressure differential between first and second chambers 52, 54 may relate to a force imparted by hydraulic cylinders 26, 32, 34 on the associated linkage structure of implement system 12.

Figure 3:
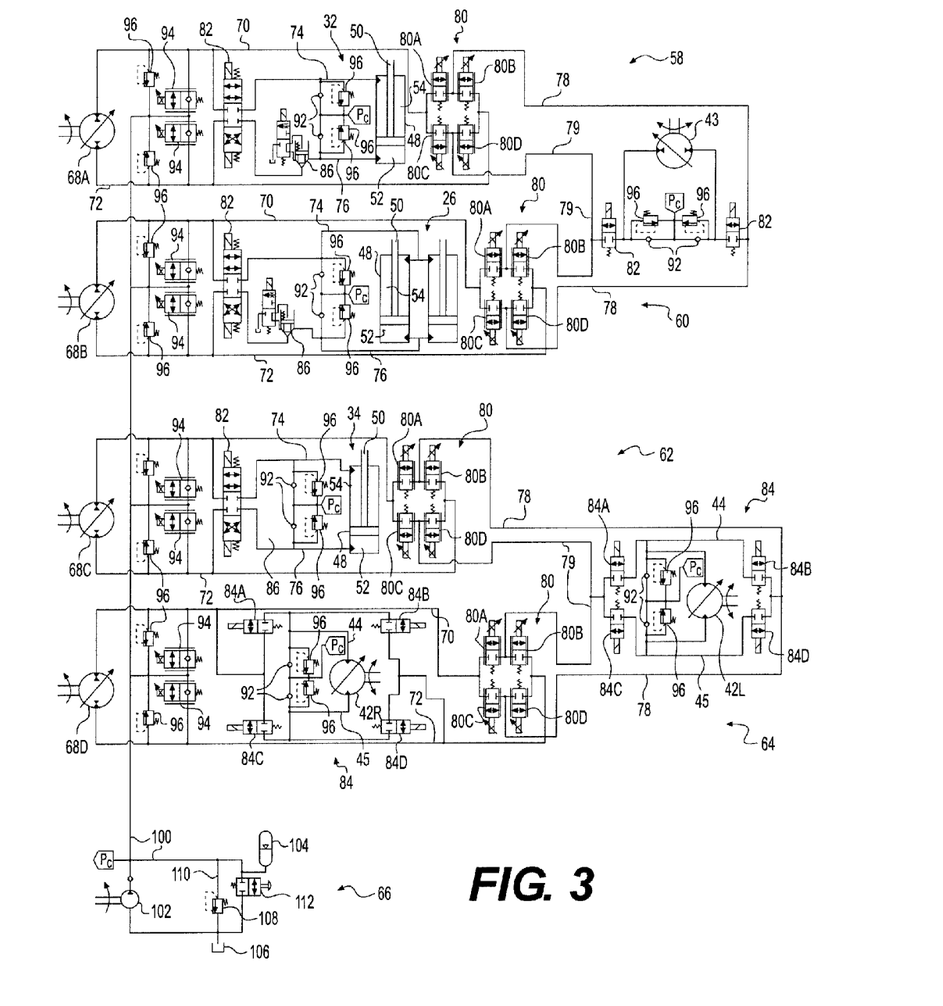
FIG. 3 is a schematic illustration of an alternative exemplary disclosed hydraulic system that may be used in conjunction with the machine of FIG. 1.

Swing motor 43, like hydraulic cylinders 26, 32, 34, may be driven by a fluid pressure differential. Specifically, swing motor 43 may include first and second chambers (not shown) located to either side of a pumping mechanism such as an impeller, plunger, or series of pistons (not shown). When the first chamber is filled with pressurized fluid and the second chamber is drained of fluid, the pumping mechanism may be urged to move or rotate in a first direction. Conversely, when the first chamber is drained of fluid and the second chamber is filled with pressurized fluid, the pumping mechanism may be urged to move or rotate in an opposite direction. The flow rate of fluid into and out of the first and second chambers may determine an output velocity of swing motor 43, while a pressure differential across the pumping mechanism may determine an output torque. It is contemplated that a displacement of swing motor 43 may be variable in the positive and/or negative direction (e.g., in an over-center configuration, as shown in FIGS. 2 and 3, or a non-over-center configuration), if desired, such that for a given flow rate and/or pressure of supplied fluid, a speed and/or torque output of swing motor 43 may be adjusted.

Similar to swing motor 43, each of left and right travel motors 42L, 42R may be driven by creating a fluid pressure differential. Specifically, each of left and right travel motors 42L, 42R may include first and second chambers (not shown) connected to either side of a pumping mechanism (not shown) via first and second actuator passages 44, 45. When the first chamber is filled with pressurized fluid via first actuator passage 44 and the second chamber is drained of fluid via second actuator passage 45, the pumping mechanism may be urged to move or rotate a corresponding traction device (40L, 40R) in a first direction. Conversely, when the first chamber is drained of the fluid via first actuator passage 44 and the second chamber is filled with the pressurized fluid via second actuator passage 45, the respective pumping mechanism may be urged to move or rotate the traction device in an opposite direction. The flow rate of fluid into and out of the first and second chambers may determine a velocity of left and right travel motors 42L, 42R, while a pressure differential between left and right travel motors 42L, 42R may determine a torque. It is contemplated that a displacement of left and right travel motors 42L, 42R may be variable in the positive and/or negative direction (e.g., in an over-center configuration or a non-over-center configuration, as shown in FIGS. 2 and 3), if desired, such that for a given flow rate and/or pressure of supplied fluid, a speed and/or torque output of travel motors 42L, 42R may be adjusted.

As illustrated in FIG. 2, machine 10 may include a hydraulic system 56 having a plurality of fluid components that cooperate to move work tool 14 (referring to FIG. 1) and machine 10. In particular, hydraulic system 56 may include, among other things, a first meterless circuit 58, a second meterless circuit 60, a third meterless circuit 62, a fourth meterless circuit 64, and a charge circuit 66. First meterless circuit 58 may be a bucket circuit associated with hydraulic cylinder 34. Second meterless circuit 60 may be a boom circuit associated with hydraulic cylinders 26. Third meterless circuit 62 may be a stick circuit associated with hydraulic cylinder 32. Fourth meterless circuit 64 may be a swing circuit associated with swing motor 43. As described below, right travel motor 42R may be in selective fluid communication with first meterless circuit 58 and/or second meterless circuit 60, and left travel motor 42L may be in selective fluid communication with third meterless circuit 62 and/or fourth meterless circuit 64. Further, as described below, first and second meterless circuits 58, 60 may be in selective fluid communication so that flow from pumps 68A and 68B, individually or in combination, may fluidly communicate with each of hydraulic cylinders 26, 34 and right travel motor 42R. Also, as described below, third and fourth meterless circuits 62, 64 may be in selective fluid communication so that flow from pumps 68C and 68D, individually or in combination, may fluidly communicate with each one of hydraulic cylinder 32, swing motor 43, and left travel motor 42L. Charge circuit 66 may be in selective fluid communication with each of first, second, third, and fourth meterless circuits 58, 60, 62, 64.

It is contemplated that additional and/or different configurations of meterless circuits may be included within hydraulic system 56 such as, for example, an independent circuit associated with each separate actuator (e.g., hydraulic cylinders 32, 34, 26, left travel motor 42L, right travel motor 42R, and/or swing motor 43), if desired. Also, in alternative embodiments, the actuators may be interchanged at their respective positions in the various circuits 58, 60, 62, 64. For example, hydraulic cylinders 32 and 34 may be interchanged such that first meterless circuit 58 may be a stick circuit associated with hydraulic cylinder 32 and third meterless circuit 62 may be a bucket circuit associated with hydraulic cylinder 34.

In the disclosed embodiment, each of meterless circuits 58, 60, 62, 64 may include a plurality of interconnecting and cooperating fluid components that facilitate the use and control of the associated actuators. For example, each meterless circuit 58, 60, 62, 64 may include a respective pump 68A-68D fluidly connected to its associated rotary and/or linear actuators in parallel via a closed-loop formed by upper-side and lower-side passages. The terms "upper" and "lower" are used herein to refer to positions of the components relative to each other in FIG. 2 for ease of explanation, but the components are not limited to these relative positions in practice. Specifically, each pump 68A-68D may be connected to the respective actuators via a first pump passage 70 and a second pump passage 72, as described below.

Each pump 68A-68D may have variable displacement and be controlled to draw fluid from its associated actuators and discharge the fluid at a specified elevated pressure back to the actuators in two different directions. That is, pumps 68A-68D may include a stroke-adjusting mechanism, for example a swashplate, a position of which is hydro-mechanically or electro-hydraulically adjusted based on, among other things, a desired speed of the actuators to thereby vary an output (e.g., a discharge rate) of pumps 68A-68D. The displacement of each pump 68A-68D may be adjusted from a zero displacement position at which substantially no fluid is discharged from the respective pump 68A-68D, to a maximum displacement position in a first direction at which fluid is discharged from the respective pump 68A-68D at a maximum rate into first pump passage 70. Likewise, the displacement of each pump 68A-68D may be adjusted from the zero displacement position to a maximum displacement position in a second direction at which fluid is discharged from the respective pump 68A-68D at a maximum rate into second pump passage 72. Each pump 68A-68D may be drivably connected to power source 18 of machine 10 by, for example, a countershaft, a belt, or in another suitable manner. Alternatively, each pump 68A-68D may be indirectly connected to power source 18 via a torque converter, a gear box, an electrical circuit, or in any other manner known in the art. It is contemplated that pumps 68A-68D of different circuits may be connected to power source 18 in tandem (e.g., via the same shaft) or in parallel (via a gear train), as desired.

As shown in FIG. 2, pumps 68A-68D may be over-center pumps or rotatable in opposing directions to produce flows of pressurized fluid in two directions. Alternatively, one or more of pumps 68A-68D may be replaced by a pump configured to produce only a unidirectional flow of pressurized fluid and a check valve for preventing back flow of pressurized fluid into the pumps 68A-68D.

One or more pumps 68A-68D may also be selectively operated as a motor. More specifically, when an associated actuator is operating in an overrunning condition (e.g., a condition in which the load drives the actuator), the fluid discharged from the actuator may have a pressure elevated higher than an output pressure of the corresponding pump(s) 68A-68D. In this situation, the elevated pressure of the actuator fluid directed back through the corresponding pump(s) 68A-68D may function to drive the corresponding pump(s) 68A-68D to rotate with or without assistance from power source 18. Under some circumstances, one or more pumps 68A-68D may even be capable of imparting energy to power source 18, thereby improving an efficiency and/or capacity of power source 18.

Each pump 68A-68D may be connected to a rotary actuator (e.g., to left-travel motor 42L, right travel motor 42R, or swing motor 43) via first pump passage 70 and second pump passage 72 in respective meterless circuit 58, 60, 62, 64. In the disclosed embodiment, each pump 68A, 68B may be connected to right travel motor 42R, and each pump 68C, 68D may be connected to left travel motor 42L and swing motor 43. For example, to cause right travel motor 42R to rotate in a first direction, first actuator passage 44 connected to right travel motor 42R may be filled with fluid pressurized by pumps 68A and/or 68B, while second actuator passage 45 connected to right travel motor 42R may be filled with fluid exiting right travel motor 42R. To reverse direction of right travel motor 42R, second actuator passage 45 may be filled with fluid pressurized by pumps 68A and/or 68B, while first actuator passage 44 may be filled with fluid exiting right travel motor 42R.

Each of pumps 68A-68D also may be connected to a linear actuator (e.g., hydraulic cylinders 26, 32, or 34) via first and second pump passages 70, 72 in respective meterless circuit 58, 60, 62, 64, and via a rod-end passage 74 and a head-end passage 76 connected to the linear actuators. In the disclosed embodiment, each pump 68A, 68B may be connected to hydraulic cylinders 26, 34, and each pump 68C, 68D may be connected to hydraulic cylinder 32. During an extending operation of a particular linear actuator, head-end passage 76 may be filled with fluid pressurized by one or more pumps 68A-68D, while rod-end passage 74 may be filled with fluid returned from the linear actuator. In contrast, during a retracting operation, rod-end passage 74 may be filled with fluid pressurized by one or more pumps 68A-68D, while head-end passage 76 may be filled with fluid returned from the linear actuator.

It may be desirable to fluidly connect an actuator to more than one of pumps 68A-68D simultaneously. For this purpose, combiner valve arrangements 80 may be provided to fluidly connect two or more meterless circuits 58, 60, 62, 64. For example, in the disclosed embodiment, a pair of combiner valve arrangements 80 are configured to fluidly connect meterless circuits 58, 60, and another pair of combiner valve arrangements 80 are configured to fluidly connect meterless circuits 62, 64. The following discussion relates to the pair of combiner valve arrangements 80 of meterless circuits 58, 60, but it is understood that the same description applies to the pair of combiner valve arrangements 80 of meterless circuits 62, 64.

By controlling combiner valve arrangements 80, hydraulic cylinders 26, 34 and right travel motor 42R may each be selectively connected to both pumps 68A and 68B in a closed loop manner. Each combiner valve arrangement 80 may include up to four independent metering cartridge valves. For example, in the disclosed embodiment, each combiner valve arrangement 80 includes a first upper valve 80A, a second upper valve 80B, a first lower valve 80C, and a second lower valve 80D. Alternatively, each combiner valve arrangement 80 may be realized using other types of valves, such as spool valves, poppet valves, etc. Valves 80A-80D may be on/off type valves, or proportional valves that are adjustable between full and partial flow-passing positions and a flow-blocking position. For example, valves 80A-80D may be solenoid-actuated between full and partial flow-passing positions, and spring-biased to the flow-blocking position.

First upper valve 80A in first meterless circuit 58 may be positioned between first pump passage 70 of first meterless circuit 58 and a first combining passage 78. Second upper valve 80B in first meterless circuit 58 may be positioned between second pump passage 72 of first meterless circuit 58 and first combining passage 78. First lower valve 80C in first meterless circuit 58 may be positioned between first pump passage 70 of first meterless circuit 58 and second combining passage 79. Second lower valve 80D in first meterless circuit 58 may be positioned between second pump passage 72 of first meterless circuit 58 and second combining passage 79. First upper valve 80A in second meterless circuit 60 may be positioned between first pump passage 70 of second meterless circuit 60 and second combining passage 79. Second upper valve 80B in second meterless circuit 60 may be positioned between second pump passage 72 of second meterless circuit 60 and second combining passage 79. First lower valve 80C in second meterless circuit 60 may be positioned between first pump passage 70 of second meterless circuit 60 and first combining passage 78. Second lower valve 80D in second meterless circuit 60 may be positioned between second pump passage 72 of second meterless circuit 60 and first combining passage 78.

Valves 80A-80D provide flow-combining functionality to allow each actuator of meterless circuits 58, 60 to be fluidly connected in a closed loop manner to pumps 68A and 68B, individually or simultaneously. When it is desired to provide pressurized fluid from pumps 68A and/or 68B to the actuators, valves 80A-80D are positioned depending on, for example, the direction of discharge of fluid from pumps 68A, 68B and/or the desired direction of movement of the actuators.

For example, when first pump passages 70 of first and second meterless circuits 58, 60 are pressurized by pumps 68A, 68B, first upper valve 80A in first meterless circuit 58 and first lower valve 80C in second meterless circuit 60 may be moved to their flow-passing positions so that pressurized fluid from pumps 68A, 68B may combine via first combining passage 78. At this same time, second lower valve 80D in first meterless circuit 58 and second upper valve 80B in second meterless circuit 60 may be in their flow-passing positions so that flow discharged from the actuators may be directed to second pump passages 72 of first and second meterless circuits 58, 60 and returned back to pumps 68A, 68B. In this configuration, each of right travel motor 42R and hydraulic cylinders 26, 34 may be connected in a closed loop manner to pumps 68A and 68B simultaneously. Combiner valve arrangements 80 of meterless circuits 62, 64 may operate similarly to combiner valve arrangements 80 of meterless circuits 58, 60, as described above. Thus, combiner valve arrangements 80 of meterless circuits 62, 64 may be selectively configured to allow the combined flow from both pumps 68C, 68D to communicate in a closed loop manner with hydraulic cylinder 32, swing motor 43, and/or left travel motor 42L.

The flow passing between each actuator and pumps 68A and/or 68B may be metered by an associated switching valve, such as spool switching valve 82 or 83, or switching valve arrangement 84 (described in detail below). Thus, although the combined flow from both pumps 68A and 68B may be communicated in a closed loop manner to each of right travel motor 42R and hydraulic cylinders 26, 34, the switching valves may be controlled to block flow to one or more of the actuators. By blocking flow to one or more of the actuators, the combined flow from both pumps 68A and 68B may be supplied to the actuators that are not blocked. For example, if spool switching valve 82 associated with hydraulic cylinder 34 is moved to its flow-blocking position (so that hydraulic cylinder 34 does not move), then the combined flow from both pumps 68A and 68B may be communicated in a closed loop manner to hydraulic cylinders 26 and right travel motor 42R. As another example, if spool switching valves 83, 82 associated with hydraulic cylinders 26 and 34 are moved to their flow-blocking positions (so that hydraulic cylinders 26 and 34 do not move), then the combined flow from both pumps 68A and 68B may be communicated in a closed loop manner only to right travel motor 42R. Accordingly, each of the switching valves 82, 83, 84 may be individually controllable to select which actuators receive the combined flow simultaneously from pumps 68A and 68B.

Combiner valve arrangements 80 in first and second meterless circuits 58, 60 may also be separately controllable to select which actuators to receive flow from which pumps 68A, 68B. For example, when valves 80A-80D in first meterless circuit 58 are all moved to their flow-blocking positions, then pressurized flow from pump 68A may be communicated in a closed loop manner only to hydraulic cylinder 34 (i.e., not hydraulic cylinders 26 or right travel motor 42R) since valves 80A-80D in first meterless circuit 58 block flow from being communicated between first and second pump passages 70, 72 in first meterless circuit 58 and first and second combining passages 78, 79. At this same time, valves 80A-80D in second meterless circuit 60 may be positioned as described above to allow pressurized flow from pump 68B to be communicated in a closed loop manner only to hydraulic cylinders 26 and right travel motor 42R (i.e., not hydraulic cylinder 34). Switching valves 83, 84 associated with hydraulic cylinders 26 and right travel motor 42R may also be individually controllable to select whether one or both of hydraulic cylinders 26 and right travel motor 42R receive pressurized flow from pump 68B.

Similarly, when valves 80A-80D in second meterless circuit 60 are moved to their flow-blocking positions, then pressurized flow from pump 68B may be communicated in a closed loop manner only to hydraulic cylinders 26 (i.e., not hydraulic cylinder 34 or right travel motor 42R) since valves 80A-80D block flow from being communicated between first and second pump passages 70, 72 in second meterless circuit 60 and first and second combining passages 78, 79. At this same time, valves 80A-80D in first meterless circuit 58 may permit flow between first meterless circuit 58 and first and second combining passages 44, 45 to allow pressurized flow from pump 68A to be communicated in a closed loop manner to only hydraulic cylinders 34 and right travel motor 42R (i.e., not hydraulic cylinders 26). Switching valves 82, 84 associated with hydraulic cylinder 34 and right travel motor 42R may also be individually controllable to select whether one or both of hydraulic cylinder 34 and right travel motor 42R receive pressurized flow from pump 68A.

When all of valves 80A-80D in both first and second meterless circuits 58, 60 are moved to their flow-blocking positions, then pressurized flow from pumps 68A and 68B are blocked from first and second combining passages 78, 79. Pressurized flow from pump 68A may be communicated in a closed loop manner only to hydraulic cylinder 34 (i.e., not hydraulic cylinders 26 or right travel motor 42R), and pressurized flow from pump 68B may be communicated in a closed loop manner only to hydraulic cylinders 26 (i.e., not hydraulic cylinder 34 or right travel motor 42R). In this configuration, right travel motor 42R does not move.

As described above, pressurized flow from pump 68A and/or pump 68B may be directed to each actuator associated with first and second meterless circuits 58, 60 via spool switching valves 82, 83 or switching valve arrangements 84. Spool switching valves 82, 83 and switching valve arrangements 84 may be controlled to determine which chambers of the actuators receive or discharge fluid and the rate at which fluid is received/discharged.

Spool switching valves 82, 83 may be controlled to direct flow to one chamber of the actuator and discharge flow from the other chamber to effect movement of the actuator. In the disclosed embodiment, spool switching valves 82, 83 are provided in meterless circuits 58, 60, 62, 64 and are fluidly connected to hydraulic cylinders 26, 32, 34, and swing motor 43, respectively. For example, swing motor 43 may include first and second actuator passages, and spool switching valves 82 may control the rate of flow through the respective actuator passages. Switching valves 82, 83 may also be controlled to direct flow, via the rod-end or head-end passages 74, 76, to first or second chamber 52, 54 of hydraulic cylinders 26, 32, 34 and discharge flow from the other one of first or second chamber 52, 54 to effect retraction or extension of the hydraulic cylinders 26, 32, 34. Spool switching valves 82, 83 may be on/off type valves, or proportional valves that are adjustable between full and partial flow-passing positions and a flow-blocking position. For example, the valves may be solenoid-actuated between full and partial flow-passing positions, and spring-biased to the flow-blocking position. When spool switching valves 82, 83 are in the flow-blocking positions, fluid flowing within first and second pump passages 70, 72 may not pass through and substantially affect the motion of the actuator.

In the disclosed embodiment shown in FIG. 2, spool switching valves 83 may be provided to control flow to respective hydraulic cylinders 26 and 32. Each spool switching valve 83 may be a five-position, solenoid-operated valve that is spring-biased toward the flow-blocking position. In the flow-blocking position, fluid flow between one or more of pumps 68A-68D and the respective hydraulic cylinders 26, 32 may be blocked. In the topmost position of spool switching valve 83, first pump passage 70 of the respective meterless circuit 60, 62 is simultaneously fluidly connected with both rod- and head-end passages 74, 76 of the respective hydraulic cylinders 26, 32. In the bottommost position of spool switching valve 83, second pump passage 72 of the respective meterless circuit 60, 62 is simultaneously fluidly connected with both rod- and head-end passages 74, 76 of the respective hydraulic cylinders 26, 32. When in the topmost or bottommost positions, fluid may be allowed to flow directly from first chamber 52 to second chamber 54 and vice versa, without first passing through any of pumps 68A-68D. This functionality may allow regeneration of fluid, which may help to reduce a load on pumps 68A-68D, while still satisfying operator demands, thereby increasing an efficiency of machine 10. In some embodiments, spool switching valve 83 may be held partially closed during regeneration to facilitate some energy dissipation that improves controllability. Alternatively, as shown in FIG. 3, three-position spool switching valves 82 (e.g., similar to the spool switching valve 82 associated with hydraulic cylinder 34) may replace five-position spool switching valves 83.

Switching valve arrangement 84 may be fluidly connected to rotary actuators (e.g., right and left travel motors 42R, 42L), respectively. Each switching valve arrangement 84 may include four valves (e.g., four independent metering valves), including a first upper valve 84A, a second upper valve 84B, a first lower valve 84C, and a second lower valve 84D. First upper valve 84A may be positioned between second combining passage 79 and first actuator passage 44. Second upper valve 84B may be positioned between first combining passage 78 and first actuator passage 44. First lower valve 84C may be positioned between second combining passage 79 and second actuator passage 45. Second lower valve 84D may be positioned between first combining passage 78 and second actuator passage 45. Like spool switching valves 82, 83, valves 84A-84D may be on/off type valves, or proportional valves that are adjustable between full and partial flow-passing positions and a flow-blocking position. For example, valves 84A-84D may be solenoid-actuated between full and partial flow-passing positions, and spring-biased to the flow-blocking position.

As described above, valves 84A-84D may control whether fluid is communicated between one or both pumps 68A and 68B to right travel motor 42R. Valves 84A-84D may also control the direction of movement of right travel motor 42R. For example, pumps 68A and/or 68B may control direction of movement of hydraulic actuators 26, 34 based on which pump passages 70, 72 in meterless circuits 58, 60 are pressurized. However, there may be times when pressurization of fluid in first pump passages 70 in meterless circuits 58, 60 and movement of right travel motor 42R in the first direction is desired, while at other times pressurization of fluid in first pump passages 70 in meterless circuits 58, 60 and movement of right travel motor 42R in the second direction is desired. During the first situation, pump 68A and/or pump 68B may be required to pressurize first actuator passage 44 via first pump passage 70 of meterless circuit 58 and/or 60, while during the second situation, pump 68A and/or pump 68B may be required to pressurize second actuator passage 45 via first pump passage 70 of meterless circuit 58 and/or 60.

Valves 84A-84D may facilitate these operations. For example, when first pump passage 70 of meterless circuit 58 and/or 60 (and first combining passage 78 via combiner valve arrangement(s) 80) is pressurized by pumps 68A and/or 68B and movement of right travel motor 42R in the first direction is desired, second upper valve 84B may be moved to its flow-passing position such that first actuator passage 44 is also pressurized. At this same time, first lower valve 84C may be in its flow-passing position such that fluid discharged from right travel motor 42R passes through second actuator passage 45 to second pump passage 72 of meterless circuit 58 and/or 60 (via combiner valve arrangement(s) 80) and back to pump(s) 68A and/or 68B. In contrast, when first pump passage 70 of meterless circuit 58 and/or 60 (and first combining passage 78 via combiner valve arrangement(s) 80) is pressurized by pumps 68A and/or 68B and movement of right travel motor 42R in the second direction is desired, second lower valve 84D may be moved to its flow-passing position such that second actuator passage 45 is also pressurized. At this same time, first upper valve 84A may be in its flow-passing position such that fluid discharged from right travel motor 42R passes through first actuator passage 44 to second pump passage 72 of meterless circuit 58 and/or 60 (via combiner valve arrangement(s) 80) and back to pump(s) 68A and/or 68B. Valves 84A-84D may also be operated to provide for movement of right travel motor 42R when second pump passage(s) 72 in meterless circuit 58 and/or 60 is pressurized.

Switching valve arrangement 84 associated with left travel motor 42L may operate similarly to switching valve arrangement 84 associated with right travel motor 42R, as described above. Accordingly, spool switching valves 82, 83 and switching valve arrangements 84 may be fluidly connected to each actuator to control or meter flow to and from the chambers of each actuator. As a result, spool switching valves 82, 83 and switching valve arrangements 84 allow speed and/or directional adjustment of an actuator independently from other actuators, such as the actuators within the same closed loop. Other types of switching valves may be provided as known in the art. Further, spool switching valves 82, 83 and switching valve arrangement 84 may be substituted for each other. For example, switching valve arrangements 84 may be replaced by spool switching valve 82 or 83 in certain applications, or vice versa.

FIG. 2 shows left and right travel motors 42L, 42R as unidirectional with corresponding switching valve arrangements 84 provided for changing the direction of movement of the respective motors 42L, 42R. Alternatively, left travel motor 42L and/or right travel motor 42R may be replaced with over-center motors, which are moveable in opposing directions independently of the direction of pressurized flow in first and second actuator passages 44, 45. In such a configuration, switching valve arrangements 84 may be replaced with spool switching valve 82 or 83 in first and second actuator passages 44, 45, as provided for swing motor 43.

Load holding valves 86 may be fluidly connected to hydraulic cylinders 26, 32 to hydraulically lock movement of the actuator when the actuator has a non-zero displacement and the associated spool switching valve 82 or 83 is in its flow blocking position. Also, check valves 92 may be provided to assist in regulating make up of fluid flow, e.g., supplied to or discharged from pumps 68A-68D and/or the actuators (e.g., hydraulic cylinders 26, 32, 34, swing motor 43, left and right travel motors 42L, 42R, etc.).

Alternatively, the actuators may be disposed in different locations, e.g., in different meterless circuits 58, 60, 62, 64. For example, as shown in FIG. 3, hydraulic cylinder 32 (and the associated load holding valve 86) and hydraulic cylinder 34 may be switched, and swing motor 43 (and the associated spool switching valves 82) and right travel motor 42R (and the associated switching valve arrangement 84) may be switched. In this embodiment, first and second meterless circuits 58, 60 may be in selective fluid communication via combiner valve arrangements 80 so that flow from pumps 68A and 68B, individually or in combination, may fluidly communicate with each of hydraulic cylinders 26, 32 and swing motor 43. Also, third and fourth meterless circuits 62, 64 may be in selective fluid communication via combiner valve arrangements 80 so that flow from pumps 68C and 68D, individually or in combination, may fluidly communicate with each one of hydraulic cylinder 34, right travel motor 42R, and left travel motor 42L. In this embodiment, right and left travel motors 42R and 42L may receive pressurized flow from the same pump(s) 68C and/or 68D, which may be desirable.

It will be appreciated by those of skill in the art that the respective rates of hydraulic fluid flowing into and out of the actuators may not be equal. For example, the respective rates of hydraulic fluid flowing into and out of first and second chambers 52, 54 of hydraulic cylinders 26, 32, 34 during extension and retraction may not be equal. Because of the location of the rod portion of piston assembly 50 within second chamber 54, piston assembly 50 may have a reduced pressure area within second chamber 54, as compared with a pressure area within first chamber 52. Accordingly, during retraction of hydraulic cylinders 26, 32, 34, more hydraulic fluid may be forced out of first chamber 52 than can be consumed by second chamber 54 and, during extension, more hydraulic fluid may be consumed by first chamber 52 than is forced out of second chamber 54. In order to accommodate the excess fluid discharge during retraction and the additional fluid required during extension, each of meterless circuits 58, 60, 62, 64 may be provided with two makeup valves 94 and two relief valves 96 that connect first and second pump passages 70, 72 to charge circuit 66 via a common passage 100.

Makeup valves 94 may each be a proportional valve that is disposed between common passage 100 and one of first and second pump passages 70, 72 and configured to selectively allow pressurized fluid from charge circuit 66 to enter first and second pump passages 70, 72. In particular, each of makeup valves 94 may be solenoid-actuated from a first position at which fluid freely flows between common passage 100 and the respective first and second pump passage 70, 72, toward a second position at which fluid from common passage 100 may flow only into first and second pump passage 70, 72 when a pressure of common passage 100 exceeds the pressure of first and second pump passages 70, 72 by a threshold amount. Makeup valves 94 may be spring-biased toward their second positions, and only moved toward their first positions during operations known to have need of positive or negative makeup fluid. Makeup valves 94 may also be used to facilitate fluid regeneration between first and second pump passages 70, 72 within a particular circuit, by simultaneously moving together at least partway to their first positions.

Relief valves 96 may be provided to allow fluid relief from each meterless circuit 58, 60, 62, 64 into charge circuit 66 when a pressure of the fluid exceeds a set threshold of relief valves 96. Relief valves 96 may be set to operate at relatively high pressure levels in order to prevent damage to hydraulic system 56, for example, at levels that may only be reached when hydraulic cylinders 26, 32, 34 reach an end-of-stroke position and the flow from associated pumps 68A-68D is nonzero, during a stall condition due to a large load, or during a failure condition of hydraulic system 56.

Charge circuit 66 may include at least one hydraulic source fluidly connected to common passage 100 described above. In the disclosed embodiment, charge circuit 66 has two sources, including a charge pump 102 and an accumulator 104, which may be fluidly connected to common passage 100 in parallel to provide makeup fluid to meterless circuits 58, 60, 62, 64. Charge pump 102 may embody, for example, an engine- or ground-driven, variable- or fixed-displacement pump configured to draw fluid from a tank 106, pressurize the fluid, and discharge the fluid into common passage 100. Accumulator 104 may embody, for example, a compressed gas, membrane/spring, or bladder type of accumulator configured to accumulate pressurized fluid from and discharge pressurized fluid into common passage 100. Excess hydraulic fluid, either from charge pump 102 or from meterless circuits 58, 60, 62, 64 (i.e., from operation of pumps 68A-68D and/or the rotary and linear actuators) may be directed into either accumulator 104 or into tank 106 by way of a charge relief valve 108 disposed in a return passage 110. Charge relief valve 108 may be movable from a flow-blocking position toward a flow-passing position as a result of elevated fluid pressures within common passage 100 and return passage 110. A manual service valve 112 may be associated with accumulator 104 to facilitate draining of accumulator 104 to tank 106 during service of charge circuit 66.

During operation of machine 10, the operator of machine 10 may utilize interface device 46 to provide a signal that identifies a desired movement of the various linear and/or rotary actuators to a controller (not shown). Based upon one or more signals, including the signal from interface device 46 and, for example, signals from various pressure and/or position sensors (not shown) located throughout hydraulic system 56, the controller may command movement of the different valves and/or displacement changes of the different pumps and motors to advance a particular one or more of the linear and/or rotary actuators to a desired position in a desired manner (i.e., at a desired speed and/or with a desired force).

The controller may embody a single microprocessor or multiple microprocessors that include components for controlling operations of hydraulic system 56 based on input from an operator of machine 10 and based on sensed or other known operational parameters. Numerous commercially available microprocessors can be configured to perform the functions of the controller. It should be appreciated that the controller could readily be embodied in a general machine microprocessor capable of controlling numerous machine functions. The controller may include a memory, a secondary storage device, a processor, and any other components for running an application. Various other circuits may be associated with the controller such as power supply circuitry, signal conditioning circuitry, solenoid driver circuitry, and other types of circuitry.

INDUSTRIAL APPLICABILITY

The disclosed hydraulic system may be applicable to any machine where improved hydraulic efficiency and performance is desired. The disclosed hydraulic system may provide for improved efficiency through the use of meterless technology. The disclosed hydraulic system may provide for enhanced functionality and control through the selective use of novel circuit configurations. Operation of hydraulic system 56 will now be described.

During operation of machine 10, an operator located within station 20 may command a particular motion of work tool 14 in a desired direction and at a desired velocity by way of interface device 46. One or more corresponding signals generated by interface device 46 may be provided to the controller indicative of the desired motion, along with machine performance information, for example sensor data such a pressure data, position data, speed data, pump displacement data, and other data known in the art.

In response to the signals from interface device 46 and based on the machine performance information, the controller may generate control signals directed to pumps 68A-68D, motors 43, 42L, 42R, and valves 80A-80D, 82, 83, 84A-84D, 86, 94. For example, based on the signals from interface device 46, the controller may determine which actuators to operate. The controller may also determine which actuators fluidly connect to which pumps 68A-68D. As described above, each actuator (e.g., hydraulic cylinders 26, 32, 34, swing motor 43, and left and right travel motors 42L, 42R) may receive flow from one or two of pumps 68A-68D. For example, in the disclosed embodiment of FIG. 2, by controlling valves 80A-80D, 82, 83, 84A-84D in meterless circuits 58, 60, each of hydraulic cylinders 26, 34 and right travel motor 42R may be selectively connected only to pump 68A in a closed loop manner, only to pump 68B in a closed loop manner, or to both pumps 68A and 68B in a closed loop manner. Similarly, by controlling valves 80A-80D, 82, 83, 84A-84D in meterless circuits 62, 64, each of hydraulic cylinder 32, swing motor 43, and left travel motor 42L may be selectively connected only to pump 68C in a closed loop manner, only to pump 68D in a closed loop manner, or to both pumps 68C and 68D in a closed loop manner.

The controller may control valves 80A-80D, 82, 83, 84A-84D depending on which actuators to operate and a desired amount of flow to direct to the actuators. For example, as described above, valves 80A-80D, 82, 83, 84A-84D in meterless circuits 58 and 60 may be controlled to select which actuators in meterless circuits 58 and 60 receive combined flow from pumps 68A and 68B. Also, valves 80A-80D, 82, 83, 84A-84D in meterless circuits 58 and 60 may be controlled to select which actuators in meterless circuits 58 and 60 receive flow from only one of pumps 68A and 68B.

In certain operations, it may be desirable to increase the amount of fluid communicated to the actuator(s), e.g., so that the actuator(s) may move faster, by providing fluid from more than one of pumps 68A-68D to the actuator(s). Thus, combined flow from two pumps may be provided to each actuator if an increase in speed of the actuator is desired within the power capabilities of the engine.

Combining flow from two pumps to supply to one or more actuators may also assist in ensuring that the actuators operate as desired. Each of pumps 68A-68D has a flow rate limit dictated by its respective maximum displacement. Certain actuators, however, may require a flow rate greater than the maximum flow provided by a single pump in order to function as desired (e.g., to fulfill cycle requirements, such as cycle timing, etc.). For example, hydraulic cylinder 32 (associated with stick 28) and hydraulic cylinders 26 (associated with boom 22) may each require flow from more than one pump in order to meet single-function performance requirements. Thus, if operation of a particular actuator is initiated and it is determined that more than one of pumps 68A-68D are needed to provide the desired flow rate to a particular actuator, then the controller may generate a control signal that causes valves 80A-80D, 82, 83, 84A-84D to communicate a combined flow from two of pumps 68A-68D to the actuator to be operated. For example, in the embodiment of FIG. 2, if hydraulic cylinders 26 are moving and hydraulic cylinder 34 and right travel motor 42R are not moving (and therefore do not require flow), and it is desired to increase the flow rate to hydraulic cylinders 26 so that the hydraulic cylinders 26 receive a combined flow from pumps 68A and 68B, the controller may generate a control signal that causes valves 80A-80D in meterless circuits 58, 60 to communicate flow from both pumps 68A and 68B to hydraulic cylinders 26. At the same time, switching valve 82 associated with hydraulic cylinder 34 and switching valve arrangement 84 associated with right travel motor 42R may be moved to their flow-blocking positions. As a result, hydraulic cylinders 26 may receive sufficient flow to operate as desired due to the combined flow from both pumps 68A and 68B.

In certain situations, multiple actuators may be operated simultaneously, but the desired flow rate to the operating actuators (the commanded amount) may exceed the flow rate that the pumps are capable of supplying to those actuators. In such situations, the controller may prioritize one or more actuators so that the desired flow rate is supplied to the actuators having higher priority. For example, in certain embodiments, hydraulic cylinder 34 associated with work tool 14 (e.g., the bucket) may have the highest priority so that if the operator is moving right travel motor 42R and hydraulic cylinders 34, 26 simultaneously, the controller may ensure that hydraulic cylinder 34 receives a flow rate at a predetermined value, which may cause less flow to be directed to right travel motor 42R and hydraulic cylinders 26. As another alternative, the controller may scale down the commanded rates of flow to all of the actuators being operated.

Further, in certain situations, since different actuators may operate simultaneously and require a different rate/pressure of flow to function as desired, valves 80A-80D, 82, 83, 84A-84D may be controlled to maintain a pressure difference between meterless circuits and/or between different actuators. For example, when a combined flow from pumps 68B and 68B is communicated in a closed loop manner to hydraulic cylinders 26 and hydraulic cylinder 34, it may be desired to supply flow at a higher pressure to hydraulic cylinders 26 than hydraulic cylinder 34. Thus, the controller may generate a control signal that causes valves 80A-80D to maintain a pressure difference so that flow in meterless circuit 60 that is communicated to hydraulic cylinders 26 is at a higher pressure than flow in meterless circuit 58 that is communicated to hydraulic cylinder 34. Alternatively, or in addition, the controller may generate a control signal that causes the switching valves 82 and/or 83 (which may be proportional-type valves, as described above) associated with respective hydraulic cylinders 26 and/or hydraulic cylinder 34 to maintain the pressure difference.

As described above, displacement control of pumps 68A-68D may depend on the desired operation of the rotary and linear actuators. When both rotary and linear actuator motion is simultaneously desired within a single closed loop, however, directional displacement control of the associated pump may be driven based solely on the desired motion of the linear actuator(s) (although the displacement magnitude of pump may be based on flow requirements of both the rotary and linear actuators). Direction or speed of the linear actuator(s) may be adjusted independently from each other and the rotary actuators. In the disclosed embodiments, speed of the linear actuator(s) may be adjusted by displacement of the associated pump(s), and switching valves 82, 83 may be controlled so that a reversal of the associated linear actuator(s) does not affect other actuators. In other words, switching valves 82, 83 may switch the direction of flow. For example, pump 68A may pressurize first pump passage 70 in meterless circuit 58 in order to effect extension of hydraulic cylinder 34 and to rotate right travel motor 42R clockwise. If retraction of hydraulic cylinder 34 is desired while maintaining the clockwise rotation of right travel motor 42R, then switching valve 82 associated with hydraulic cylinder 34 may switch the direction of flow to hydraulic cylinder 34 to effect retraction without having to adjust the direction of flow from pump 68A, which would affect the direction of rotation of right travel motor 42R. In order to cause the rotary actuator(s) to move in a desired direction at a desired speed and/or with a desired torque, the displacement of the rotary actuator(s) may be selectively varied. Switching valve arrangement(s) 84 associated with the rotary actuator(s) may be actuated to control the direction of the rotary actuator(s).

When two or more of the linear and/or rotary actuators receive flow from one or two of pumps 68A-68D, then displacement control of the pump(s) may be determined based on the meterless circuit receiving flow from the pump(s) having the higher load (pressure). For example, when a combined flow from pumps 68A and 68B is communicated in a closed loop manner to hydraulic cylinder 34 and right travel motor 42R, it may be desired to supply flow at a higher pressure to hydraulic cylinder 34 than right travel motor 42R. Thus, directional displacement of pumps 68A and 68B may be controlled to ensure that the higher pressure for hydraulic cylinder 34 is supplied. Displacement of right travel motor 42R may be adjusted to meet its torque demand. As another example, when a combined flow from pumps 68A and 68B is communicated in a closed loop manner to hydraulic cylinder 34 and right travel motor 42R, it may be desired to supply flow at a higher pressure to right travel motor 42R than hydraulic cylinder 34. Thus, directional displacement of pumps 68A and 68B may be controlled to ensure that the higher pressure for right travel motor 42R is supplied. Flow to hydraulic cylinder 34 may be controlled by throttling flow to hydraulic cylinder 34 via spool switching valve arrangement 82 in meterless circuit 58.

Regeneration of fluid may be possible during retracting and/or extending operations of the linear actuators, such as hydraulic cylinder(s) 26, 32, 34, when the pressure of fluid exiting the hydraulic cylinder is higher than the pressure of fluid entering the hydraulic cylinder (e.g., when the pressure in first chamber 52 is higher than the pressure in second chamber 54 of hydraulic cylinder(s) 26, 32, 34 for the case of an overrunning retraction operation of the hydraulic cylinder). Specifically, during the retracting operation described above, both of makeup valves 94 for the respective hydraulic cylinder(s) 26, 32, 34 may be simultaneously moved toward their flow-passing positions. In this configuration, makeup valves 94 may allow some of the fluid exiting first chamber 52 to bypass pump(s) 68A-68D and flow directly into second chamber 54. During the extending operation, both makeup valves 94 may allow some of the fluid exiting second chamber 54 to bypass pump(s) 68A-68D and flow directly into first chamber 52. These operations may help to reduce a load on pumps 68A-68D, while still satisfying operator demands, thereby increasing an efficiency of machine 10. In some embodiments, makeup valves 94 may be held partially closed during regeneration to facilitate some energy dissipation that improves controllability.

Makeup valves 94 may also be used to allow flow to bypass pumps 68A-68D so that an operator of machine 10 may experience an "open-center" feel associated with control of the associated hydraulic cylinder(s) 26, 32, 34. For example, makeup valves 94 may be controlled to bypass flow when the load increases up to the point of stopping motion of the actuator, e.g., determined based on a monitored or sensed flow pressure. The "open-center" feel may provide the operator with a feel for the load on the hydraulic cylinder(s) 26, 32, 34.

In the disclosed embodiments of hydraulic system 56, flows provided by pumps 68A-68D may be substantially unrestricted such that significant energy is not unnecessarily wasted in the actuation process. Thus, embodiments of the disclosure may provide improved energy usage and conservation. In addition, the meterless operation of hydraulic system 56 may, in some applications, allow for a reduction or even complete elimination of metering valves for controlling fluid flow associated with the linear and rotary actuators. This reduction may result in a less complicated and/or less expensive system.

The disclosed hydraulic system may also provide for enhanced pump overspeed protection. In particular, during overrunning retracting or extending operations of hydraulic cylinders 26, 32, 34, when fluid exiting first chambers 52 (or second chambers 54) has elevated pressures, the highly-pressurized fluid may be rerouted back into second chambers 54 (or first chambers 52) via makeup valves 94, without the fluid ever passing through pumps 68A-68D. Not only does the rerouting help to improve machine efficiencies, but the bypassing of pumps 68A-68D may also reduce a likelihood of pumps 68A-68D overspeeding.

It will be apparent to those skilled in the art that various modifications and variations can be made to the disclosed hydraulic system. Other embodiments will be apparent to those skilled in the art from consideration of the specification and practice of the disclosed hydraulic system. It is intended that the specification and examples be considered as exemplary only, with a true scope being indicated by the following claims and their equivalents.

What is claimed is:

1. A hydraulic system comprising:
 a variable-displacement first pump;
 a variable-displacement second pump;
 a first actuator selectively connected either to the first pump in a closed loop manner and not the second pump, to the second pump in a closed loop manner and not the first pump, or to the first and second pumps in a closed loop manner;
 a second actuator selectively connected either to the first pump in a closed loop manner and not the second pump, to the second pump in a closed loop manner and not the first pump, or to the first and second pumps in a closed loop manner; and
 a variable-displacement rotary actuator selectively connected either to the first pump in a closed loop manner and not the second pump, to the second pump in a closed loop manner and not the first pump, or to the first and second pumps in a closed loop manner.

2. The hydraulic system of claim 1, further comprising:
 a first combiner valve arrangement configured to selectively allow the first pump to connect in a closed loop manner either to:
  the first actuator, and not the second actuator or the rotary actuator, or
  the first actuator simultaneously with at least one of the second actuator or the rotary actuator; and
 a second combiner valve arrangement configured to selectively allow the second pump to connect in a closed loop manner either to:
  the second actuator, and not the first actuator or the rotary actuator, or
  the second actuator simultaneously with at least one of the first actuator or the rotary actuator.

3. The hydraulic system of claim 2, wherein the first and second combiner valve arrangements are configured to be actuated to allow both the first pump and the second pump to fluidly connect to the first actuator, the second actuator, and the rotary actuator simultaneously in a closed loop manner.

4. The hydraulic system of claim 2, wherein:
 each of the first and second combiner valve arrangements includes four independent metering valves; and
 when the four valves are in flow-blocking positions, the first pump is fluidly connected in a closed loop manner to the first actuator, and not the second actuator or the rotary actuator, and the second pump is fluidly connected in a closed loop manner to the second actuator, and not first second actuator or the rotary actuator.

5. The hydraulic system of claim 1, wherein the first and second pumps are over-center pumps.

6. The hydraulic system of claim 1, wherein the first actuator is a linear actuator.

7. The hydraulic system of claim 1, wherein the first actuator is a second rotary actuator.

8. The hydraulic system of claim 1, further comprising:
 at least one switching valve fluidly connected to at least one of the first actuator, the second actuator, or the rotary actuator;
 wherein the at least one switching valve is configured to control an amount of fluid through a first passage and a second passage connected to the at least one of the first actuator, the second actuator, or the rotary actuator.

9. The hydraulic system of claim 8, wherein the at least one switching valve includes a spool switching valve configured to control the amount of fluid passing through the first passage and the second passage connected to the first actuator, the first actuator being a linear actuator.

10. The hydraulic system of claim 1, further comprising:
 a switching valve arrangement fluidly connected to at least one of the first actuator or the rotary actuator, the switching valve arrangement including four independent metering valves configured to control a direction of movement of the at least one of the first actuator or the rotary actuator.

11. The hydraulic system of claim 1, wherein the first and second actuators are linear actuators, the hydraulic system further comprising:

at least one first switching valve fluidly connected to the first actuator; and at least one second switching valve fluidly connected to the second actuator;

wherein, when the first and second pumps are simultaneously connected to at least one of the first and second actuators in a closed-loop manner, the at least one first switching valve is configured to meter flow to the first actuator and the at least one second switching valve is configured to meter flow to the second actuator to adjust directions of flow of the first and second actuators independently.

12. The hydraulic system of claim 11, wherein displacement of the rotary actuator is adjustable to control torque output of the rotary actuator while the directions of flow of the first and second actuators are independently adjustable via the at least one first switching valve and the at least one second switching valve.

13. The hydraulic system of claim 1, wherein the first actuator is a linear actuator, and displacements of the first and second pumps are adjustable to control a speed of the first actuator.

14. The hydraulic system of claim 1, further comprising:
a controller configured to determine a pressure associated with at least one of the first actuator, the second actuator, and the rotary actuator;
the controller being further configured to adjust displacements of the first and second pumps based on a highest pressure associated with the at least one of the first actuator, the second actuator, and the rotary actuator.

15. The hydraulic system of claim 1, wherein the first actuator, the second actuator, and the rotary actuator are configured to simultaneously receive fluid from at least one of the first pump or the second pump so that the first actuator, the second actuator, and the rotary actuator move simultaneously.

16. The hydraulic system of claim 15, wherein, when the first actuator, the second actuator, and the rotary actuator simultaneously receive fluid from at least one of the first pump or the second pump, at least one of the first actuator, the second actuator, and the rotary actuator is configured to be connected in a closed loop manner to the first pump and the second pump to receive a combined flow from the first pump and the second pump.

17. The hydraulic system of claim 1, wherein:
the hydraulic system is provided in a machine including a body, an implement system, and a drive system, the drive system including a left traction device driven by a left travel motor and a right traction device driven by a right travel motor;
the first actuator is a hydraulic cylinder configured to move the at least one of a stick of the implement system or a work tool of the machine;
the second actuator is a hydraulic cylinder configured to move a boom of the implement system; and
the rotary actuator is the right travel motor.

18. The hydraulic system of claim 1, wherein:
the hydraulic system is provided in a machine including a body, an implement system, and a drive system, the drive system including a left traction device driven by a left travel motor and a right traction device driven by a right travel motor;
the first actuator is a hydraulic cylinder configured to move the at least one of a stick of the implement system or a work tool of the machine;

the second actuator is a swing motor configured to move the body; and
the rotary actuator is the left travel motor.

19. A hydraulic system comprising:
a variable-displacement first pump;
a variable-displacement second pump;
a first actuator configured to connect to at least one of the first pump or the second pump in a closed loop manner;
a linear actuator configured to connect to at least one of the first pump or the second pump in a closed loop manner;
a variable-displacement rotary actuator configured to connect to at least one of the first pump or the second pump in a closed loop manner;
at least one combiner valve arrangement configured to combine fluid pressurized by the first pump and the second pump to form a combined flow, the combined flow being communicated in a closed loop manner to at least one of the first actuator, the linear actuator, or the rotary actuator; and
at least one first switching valve connected to the linear actuator, the at least one switching valve being configured to control an amount of fluid directed to the linear actuator from at least one of the first pump or the second pump;
wherein the first and second pumps are capable of simultaneously supplying pressurized fluid to the first actuator, the linear actuator, and the rotary actuator.

20. The hydraulic system of claim 19, further comprising at least one second switching valve fluidly connected to the first actuator, the at least one second switching valve being configured to control an amount of fluid directed to the first actuator.

21. The hydraulic system of claim 19, further comprising at least one third switching valve fluidly connected to the rotary actuator, the at least one third switching valve being configured to control movement of the rotary actuator.

22. A method of operating a hydraulic system, the method comprising:
pressurizing fluid with a first variable-displacement pump;
pressurizing fluid with a second variable-displacement pump, the first and second pumps being capable of simultaneously supplying pressurized fluid to at least three actuators, the at least three actuators including a variable-displacement rotary actuator, a linear actuator, and a third actuator;
combining fluid pressurized by the first pump and the second pump;
communicating the combined fluid to at least one of the at least three actuators in a closed loop manner;
communicating fluid pressurized by at least one of the first pump or the second pump to the linear actuator in a closed loop manner;
communicating fluid pressurized by at least one of the first pump or the second pump to the rotary actuator in a closed loop manner;
adjusting displacement of the rotary actuator to control torque output of the rotary actuator; and
metering the flow passing between the first and second pumps and the linear actuator to control movement of the linear actuator.

23. The method of claim 22, further comprising communicating the combined fluid to at least two of the at least three actuators in a closed loop manner.

* * * * *